3,413,120
PROCESS FOR REMOVING COLLOIDAL PROTEIN-
ACEOUS SUBSTANCES CAUSING TURBIDITY
FROM FERMENTED BEVERAGES AND ESPE-
CIALLY FROM BEER
Karl Achenbach, Frankfurt am Main-Fechenheim, Germany, assignor to Deutsche Gold- und Silber-Scheideanstalt vormals Roessler, Frankfurt am Main, Germany
No Drawing. Filed Feb. 19, 1965, Ser. No. 434,127
Claims priority, application Germany, Feb. 20, 1964,
D 43,679
4 Claims. (Cl. 99—48)

ABSTRACT OF THE DISCLOSURE

Method of removing colloidal proteinaceous substances capable of producing turbidity from a fermented beverage containing such turbidity producing substances by contacting said fermented beverage with a calcium silicate having a calcium content calculated as CaO of 0.1 to 5% by weight and having secondary particles of a particle size between about 1 to $15\mu$ which are agglomerates of primary particles of a particle size below $0.1\mu$, produced by reaction of an aqueous suspension of finely divided $SiO_2$ with calcium hydroxide at a temperature between 150 and 250° C. under pressure followed by leaching with a dilute acid forming soluble salts with calcium.

---

The present invention relates to a process for improving the so-called protein stability in fermented beverages and especially in beer by treatment with a silicate.

It is known that clouding of fermented beverages and above all of beer after longer storage can be traced back to the presence of unstable albumin colloids which upon aging, denaturing and formation of adsorption compounds over a period of time agglomerate to larger particles with disturbances of the colloidal equilibrium and appear as streaks or turbidity. The appearance of such clouding is usually accompanied by a change in flavor and foam stability. As a result attempts have been made to remove the albumins giving rise to turbidities and clouding selectively by their adsorption on appropriate finely divided substances which are then separated from the beverages. The adsorbents, of course, must be insoluble in the beverages treated therewith and be easily removed from the beverages by sedimentation and filtration. In addition, they cannot deleteriously affect the taste and other desirable qualities of the fermented beverage such as, for example, the body and foam forming ability in beer. In addition to asbestos, kieselguhr and bentonites, silica gel preparations have been used for this purpose. A certain selectivity can be ascribed to their capacity for absorbing albumins in that they selectively adsorb such albumins which are the cause of turbidity whereas other albumins which are not deleterious in this respect are not removed or removed to a lesser extent. Previously the best suited substances of this group were so-called wide pored silica gels which at a particle size of 20 to $40\mu$ have a bulk density of 500 g./liter, a pore volume between 0.6 and 1.2 ml./g. and pore diameters between 60 and 150 A. Various processes are known for the preparation of such wide pored silica gels, in which, in general, the processing conditions must be closely adhered to in order to attain reproducible results with regard to optimum pore widths and volumes. It was found, however, that such wide pored silica gels in general have a wide particle size distribution and therefore do not fully satisfy with regard to their sedimentation behavior. It is important nevertheless for advantageous processing of beer which has been treated with such substances that the added substances rapidly and completely settle out and that the subsequent processing of the beer can be carried out without unduly long intervening storage periods.

According to the invention in was unexpectedly found that the disadvantages indicated above can be overcome by employing a finely divided calcium silicate for effecting an improvement in the so-called protein stability of fermented beverages and especially of beer. The product which is used according to the invention contains 0.1 to 5.0% by weight of calcium calculated as CaO. Products with a CaO content between 0.2 to 2.0% are especially well suited. The calcium silicate powders have a very narrow particle size distribution band. The size of the secondary particles very preponderantly lies between 1 and $15\mu$ and, preferably, is not over about $10\mu$ and the bulk density thereof usually is between 80 and 100 g./liter and does not lie over 150 g./liter.

The preparation of a suitable calcium silicate, in contrast to that of the wide pored silica gels, does not require any special precautions to obtain certain pore diameters and volumes which lie in narrow ranges.

The calcium silicates employed according to the invention expediently are produced by reacting natural materials which predominantly or practically completely are of silicon dioxide, such as, for example, quartz sand, in aqueous suspension with calcium hydroxide, the solids to water ratio in such suspension being less than about 1:7, at superatmospheric pressures at temperatures between about 150 and 250° C., preferably, about 190° C., and subsequently leaching the reacted suspension with a dilute acid, such as, acetic acid or hydrochloric acid, until the CaO content is reduced to between 0.1 and 5%. The molar ratio of $SiO_2$:CaO before the reaction should be about 0.1:0.5 to 1:1.5. Preferably, the acid treatment is also carried out at elevated temperatures, for example, at about 60 to 80° C. Advantageously the siliceous starting materials, such as, quartz sand, have a particle size between 1 and $20\mu$ and preferably between about 1 and $10\mu$.

Evidently the activity of the calcium silicates thus prepared does not depend upon the presence of pores but rather upon the fact that such substances consist of agglomerates of spherical and needle or rod shaped primary particles of a particle size below $0.1\mu$ and expediently below $0.05\mu$. These agglomerates which have a particle size of the order of that of the starting material are especially well suited for the selective adsorption of the proteins concerned and quickly settle out of the liquid, for example, beer, treated therewith because of their substantially uniform particle size without causing a lasting turbidity and can be separated therefrom by simple filtration.

In addition it was unexpectedly found that beer treated according to the invention undergoes an improvement in flavor and has a good foam holding capacity.

The following example will serve to illustrate the invention.

EXAMPLE 175 hectoliters of beer were treated in each test with 120 g./hl. of wide pored silica gel in one series of the tests and with 120 g./hl. of a calcium polysilicate according to the invention in the other series. The total nitrogen content or respectively the reduction in nitrogen content, the foam breakdown, the color, the stability and flavor of the treated beer were determined and in each instance compared with that of the untreated original beer.

The foam breakdown was followed microscopically according to a standard method and time required given in seconds.

The color determination was effected colorimetrically according to brand by comparison with a N/10 iodine solution.

The stability was measured using an accelerated test accepted by the European Brewery Convention (E.B.C.), namely, by:

First storing the beer warm for two days at 45° C. followed by the first turbidity measurement with a Nephelometer, then storing the beer for 1 day at 0° C. and 3 days at 45° C. followed by the second turbidity measurement and then again storing cold for 1 day at 0° C. and 2 days warm at 45° C. followed by a third turbidity measurement. Thereafter the cycle can be repeated as often as desired. Turbidities which remain below 1.5 as long as possible are striven for. The later this value is reached in the accelerated test the better is the expected stability on storage.

The determination of the flavor was carried out by having three experts taste covered samples of each of the beers and ascribe thereto a flavor value of 1 to 3 with the provision that the best flavored beer was given the flavor value of 1. Therefore the lower the flavor value the better is the flavor of the beer.

The results of the comparative tests are given in the following table.

TABLE 1

|  | Original untreated beer | After treatment | |
|---|---|---|---|
|  |  | With wide pored silica gel | With calcium silicate |
| Total nitrogen, mg./100 ml_ | 67.2 | 63.0 | 59.0 |
| Decrease in nitrogen_ |  | 4.2 | 8.2 |
| Foam breakdown, seconds_ | 69 | 46 | 52 |
| Color according to brand_ | 0.50 | 0.38 | 0.36 |

|  |  | 1 | 2 | 1 | 2 |
|---|---|---|---|---|---|
| Stability according to Helm (E.B.C.). | 0.7 | 0.7 | 0.7 | 0.6 | 0.7 |
|  | 1.5 | 0.8 | 0.7 | 0.7 | 0.7 |
|  | 12.0 | 1.3 | 0.9 | 0.9 | 0.8 |
|  |  | 2.9 | 1.5 | 1.4 | 1.2 |
|  |  | 3.6 | 1.9 | 1.8 | 1.6 |
| Flavor value_ | 2.33 | 2.00 | | 1.67 | |

As can be seen from such tabulation, the calcium silicate according to the invention effected removal of almost double the quantity of the albumin removed by the wide pored silica gel. In addition, it caused a desired lightening in the color of the beer whereas the foam holding capacity despite the higher removal of albumin is not reduced as much as in the beer treated with wide pored silica gel. The stability test showed that the turbidity value of 1.5 was only reached or only slightly exceeded in the fifth row with the beer treated according to the invention whereas with the beer treated with the wide pored silica gel it was already reached or exceeded in the fourth row. Also, the flavor improvement is considerable.

The quantity of calcium silicate contacted with the beer according to the invention preferably is between about 50 and 250 g. per hectoliter.

According to already known processes a definite calcium-silicate can be produced, e.g., by a hydrothermal decomposition with calcium oxide. This is present in a X-ray amorphous form and may change into different crystalline modifications. From this a silicate in a hydrated form will be obtained by extraction with acid which after a heat treatment has e.g. the following composition:

|  | Percent |
|---|---|
| CaO | 3.0 |
| SiO$_2$ | 92.0 |
| H$_2$O (bonded) | 5.0 |
|  | 100.0 |

The calcium-silicate according to the invention corresponds, e.g., to the formula $$1\ CaO : 28.63\ SiO_2 : 5.20\ H_2O$$

According to the invention also calcium-silicates with higher or respectively lower contents of SiO$_2$ than those in the said example are applicable.

I claim:

1. A method of removing colloidal proteinaceous substances capable of producing turbidity from a fermented beverage containing such turbidity producing substances which comprises contacting said fermented beverage with a calcium-silicate having a calcium content calculated as CaO of 0.1 to 5% by weight and having secondary particles of a particle size between about 1 to 15μ which are agglomerates of primary particles of a particle size below 0.1μ, produced by reaction of an aqueous suspension of finely divided SiO$_2$ with calcium hydroxide at a temperature between 150 and 250° C. under pressure followed by leaching with a dilute acid forming soluble salts with calcium.

2. The method of claim 1 in which said fermented beverage is beer.

3. The method of claim 2 in which the calcium content of said calcium-silicate is 0.2–1.5% by weight, the secondary particle size of said calcium-silicate is between about 1 and 10μ and its primary particle size is below 0.05μ.

4. The method of claim 2 in which the quantity of calcium-silicate contacted with the beer is between 50 and 250 g. per hectoliter.

References Cited

UNITED STATES PATENTS

| 3,251,693 | 5/1966 | Brenner | 99—48 |
| 2,940,830 | 6/1960 | Thornhill | 23—182 |
| 2,966,441 | 12/1960 | Linden et al. | 23—110 |

LIONEL M. SHAPIRO, *Primary Examiner.*

D. M. NAFF, *Assistant Examiner.*